(12) United States Patent
Ookubo et al.

(10) Patent No.: US 9,590,777 B2
(45) Date of Patent: Mar. 7, 2017

(54) BASE STATION AND RADIO COMMUNICATION METHOD

(75) Inventors: Naoto Ookubo, Tokyo (JP); Yoshiaki Ofuji, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 86 days.

(21) Appl. No.: 14/343,487

(22) PCT Filed: Sep. 6, 2012

(86) PCT No.: PCT/JP2012/072706
§ 371 (c)(1),
(2), (4) Date: Mar. 7, 2014

(87) PCT Pub. No.: WO2013/035774
PCT Pub. Date: Mar. 14, 2013

(65) Prior Publication Data
US 2014/0226604 A1    Aug. 14, 2014

(30) Foreign Application Priority Data

Sep. 9, 2011    (JP) .................................. 2011-197613

(51) Int. Cl.
| H04L 5/00 | (2006.01) |
| H04W 72/12 | (2009.01) |
| H04W 72/04 | (2009.01) |

(52) U.S. Cl.
CPC ....... *H04L 5/0037* (2013.01); *H04W 72/1205* (2013.01); *H04W 72/04* (2013.01)

(58) Field of Classification Search
CPC .......... H04L 15/0037; H04W 72/1205; H04W 72/04

USPC ......................................... 370/329
See application file for complete search history.

(56) References Cited

U.S. PATENT DOCUMENTS

| 2009/0215446 | A1* | 8/2009 | Hapsari | H04W 48/18 455/432.1 |
| 2009/0323565 | A1* | 12/2009 | Funakubo | H04L 5/22 370/280 |
| 2011/0151913 | A1* | 6/2011 | Forster | H04W 4/20 455/509 |
| 2011/0243075 | A1* | 10/2011 | Luo | H04W 74/004 370/329 |
| 2012/0020346 | A1* | 1/2012 | Ganapathy | H04W 36/0033 370/338 |
| 2013/0039188 | A1* | 2/2013 | Larsson | H04L 5/0053 370/241 |

(Continued)

OTHER PUBLICATIONS

International Search Report issued in PCT/JP2012/072706 mailed on Dec. 4, 2011 (2 pages).

(Continued)

*Primary Examiner* — Melvin Marcelo
*Assistant Examiner* — Peter G Solinsky
(74) *Attorney, Agent, or Firm* — Osha Liang LLP (57) ABSTRACT

A base station 100 includes a scheduling processing unit 109 configured to schedule each of multiple mobile stations to the PDCCH, and a UE-type judgment unit 107 configured to judge whether each of the mobile stations is an OLD UE supporting only CFI=1 to 3 or a NEW UE supporting CFI=1 to 4. The scheduling processing unit 109 schedules each of the multiple UEs to the PDCCH by use of any one of CFI=1 to 3 when UEs targeted to be scheduled to the PDCCH include an OLD UE.

5 Claims, 5 Drawing Sheets

(56) References Cited

U.S. PATENT DOCUMENTS

| | | | | |
|---|---|---|---|---|
| 2013/0201841 | A1* | 8/2013 | Zhang | H04L 1/1607 370/252 |
| 2014/0192753 | A1* | 7/2014 | Jang | H04L 5/0094 370/329 |
| 2014/0226603 | A1* | 8/2014 | Ookubo | H04W 72/12 370/329 |
| 2015/0223178 | A1* | 8/2015 | Pietraski | H04L 5/001 370/252 |

OTHER PUBLICATIONS

KDDI Corporation; "Downlink control signaling enhancement in CoMP Scenario 4"; 3GPP TSG RAN WG1 Meeting #66, R1-112162; Athens, Greece; Aug. 22-26, 2011 (4 pages).

Huawei, HiSilicon; "Investigation on downlink control channel and signalling enhancements"; 3GPP TSG RAN WG1#66, R1-112049; Athens, Greece; Aug. 22-26, 2011 (4 pages).

Rapporteur (Samsung); "REL-9 PDU specification—Review issue list"; 3GPP TSG-RAN2#68bis meeting, R2-100363; Valencia, Spain; Jan. 18-22, 2010 (53 pages).

3GPP TS 36.300 V10.3.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)"; Mar. 2011 (197 pages).

* cited by examiner

| BIT | UP TO Rel. 10 (OLD UE) | Rel. 11 (NEW UE) EMPLOYING PDCCH ENHANCEMENT |
|---|---|---|
| 00 | CFI=1 | CFI=1 |
| 01 | CFI=2 | CFI=2 |
| 10 | CFI=3 | CFI=3 |
| 11 | RESERVED | CFI=4 |

FIG. 6

BASE STATION AND RADIO COMMUNICATION METHOD

TECHNICAL FIELD

The present invention relates to a base station which communicates with each of multiple mobile stations on a physical downlink control channel allocated to a predetermined area in a subframe, by use of any one of allocation formats of the physical downlink control channel, and also relates to a radio communication method therefor.

BACKGROUND ART

In Long Term Evolution (LTE) standardized by 3rd Generation Partnership Project (3GPP), N OFDM symbols from the head of each subframe are reserved for an area usable as a physical downlink control channel (PDCCH). The N value is called a control format indicator (CFI), and a base station (eNB) notifies a mobile station (UE) of the CFI value on a physical control format indicator channel (PCFICH) (e.g., Non-patent document 1).

The N value can be changed among subframes. Thus, a large N value can be set for a mobile station reporting a low channel quality indicator (CQI) value and therefore requiring many PDCCH resources, such as one located on the edge of a cell. Meanwhile, a small N value can be set for a mobile station requiring only few PDCCH sources, such as one located near the base station.

PRIOR ART DOCUMENT

Non-Patent Document

Non-patent document 1: 3GPP TS 36.300 V10.3.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), March 2011

SUMMARY OF THE INVENTION

Incidentally, LTE-Advanced has newly-added specifications relating to a heterogeneous network (HetNet) and a relaying function, and is therefore expected to need an increased amount of PDCCH resources. Thus, PDCCH enhancement for increasing the capacity for PDCCH resources is discussed in Release 11 as an improvement in LTE-Advanced. Release 10 and earlier releases specify that two bits are used for the CFI, and that the N value is any one of 1 to 3. Release 11, if two bits are still used for the CFI, considers newly adding "4" to 1 to 3 as the N value.

However, if "4" is added as a new N value, a mobile station not supporting such PDCCH enhancement cannot correctly recognize the PDCCH area in a subframe when N=4, and consequently cannot correctly receive a physical downlink shared channel (PDSCH) in the subframe.

Specifically, on a subframe, PDCCH resources are allocated to each mobile station with a minimum unit of a resource element group (REG) constituted by multiple resource elements, and the position of the REG is uniquely determined by an UE-ID, a subframe number, or the like. Since the position of the PDCCH resources to which each mobile station is scheduled differs depending on the N value, the position of PDCCH resources is different between, for example, a case where N=3 and a case where N=4. Thus, if "4" is added as a new N value, a mobile station not supporting the PDCCH enhancement erroneously determines that N is any one of 1 to 3 even when N is 4, which consequently prevents the mobile station from correctly receiving the PDSCH in the subframe as well.

Thus, the present invention has been made in view of such circumstances, and has an objective of providing a base station and a radio communication method which can allow mobile stations to correctly receive a physical downlink control channel (PDCCH) and a physical downlink shared channel, even if the mobile stations include ones supporting PDCCH enhancement and ones not supporting PDCCH enhancement.

A first feature of the present invention is summarized as a base station (base station 100) which communicates with multiple mobile stations (e.g., mobile stations 200A) on a physical downlink control channel allocated to a predetermined area in a subframe, by use of any one of allocation formats (CFI) of the physical downlink control channel (PDCCH), the base station including: a scheduling unit (scheduling processing unit 109) configured to schedule multiple mobile stations to the physical downlink control channel; and a mobile-station type judgment unit (UE-type judgment unit 107) configured to acquire information on whether multiple mobile stations is a first-type mobile station supporting only a first predetermined number (CFI=1 to 3) of the allocation formats or a second-type mobile station supporting a second predetermined number (CFI=1 to 4) of the allocation formats which include the first predetermined number of the allocation formats, the second predetermined number being larger than the first predetermined number, wherein the scheduling processing unit schedules multiple mobile stations to the physical downlink control channel by use of any one of the first predetermined number of the allocation formats when mobile stations targeted to be scheduled to the physical downlink control channel includes the first-type mobile station.

A second feature of the present invention is summarized as a radio communication method for communicating with multiple mobile stations on a physical downlink control channel allocated to a predetermined area in a subframe, by use of any one of allocation formats of the physical downlink control channel, the method including the steps of: scheduling multiple mobile stations to the physical downlink control channel; and acquiring whether multiple mobile stations is a first-type mobile station supporting only a first predetermined number of the formats or a second-type mobile station supporting a second predetermined number of the formats, the second predetermined number being larger than the first predetermined number, wherein in the scheduling step, multiple mobile stations is scheduled to the physical downlink control channel by use of any one of the first predetermined number of the allocation formats when mobile stations targeted to be scheduled to the physical downlink control channel include the first-type mobile station.

MODE FOR CARRYING OUT THE INVENTION

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

(1) Overall Schematic Configuration of the Radio Communication System

Figure 1:
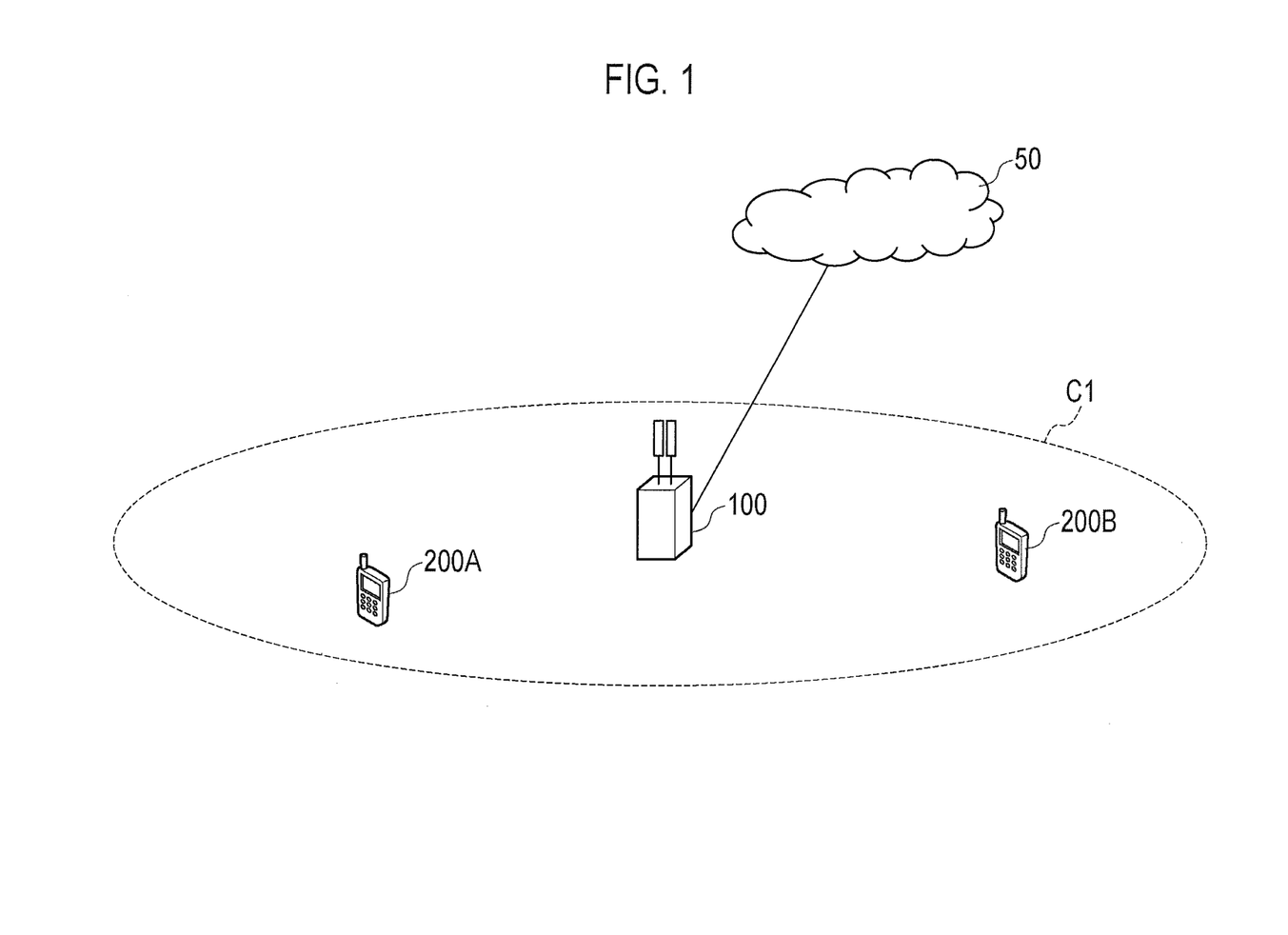
FIG. 1 is a diagram showing an overall schematic configuration of a radio communication system according to an embodiment of the present invention.

FIG. 1 is a diagram showing an overall schematic configuration of a radio communication system according to this embodiment. As shown in FIG. 1, the radio communication system according to this embodiment employs an Long Term Evolution (LTE) scheme, and includes a core network 50, a base station 100 (eNB), and mobile stations 200A, 200B (UEs).

The base station 100 is connected to the core network 50. The base station 100 forms a cell C1 and performs radio communication with the mobile station 200A (or the mobile station 200B, the same applies below) according to the LTE scheme.

In particular, in this embodiment, the base station 100 performs communication with the multiple mobile stations on a physical downlink control channel (PDCCH) allocated to a predetermined area in a subframe, by use of any one of allocation formats (CFIs) of the physical downlink control channel, the subframe being repeatedly transmitted from the base station 100 to the mobile stations camping on the cell C1.

(2) Functional Block Configuration of the Base Station

Figure 2:
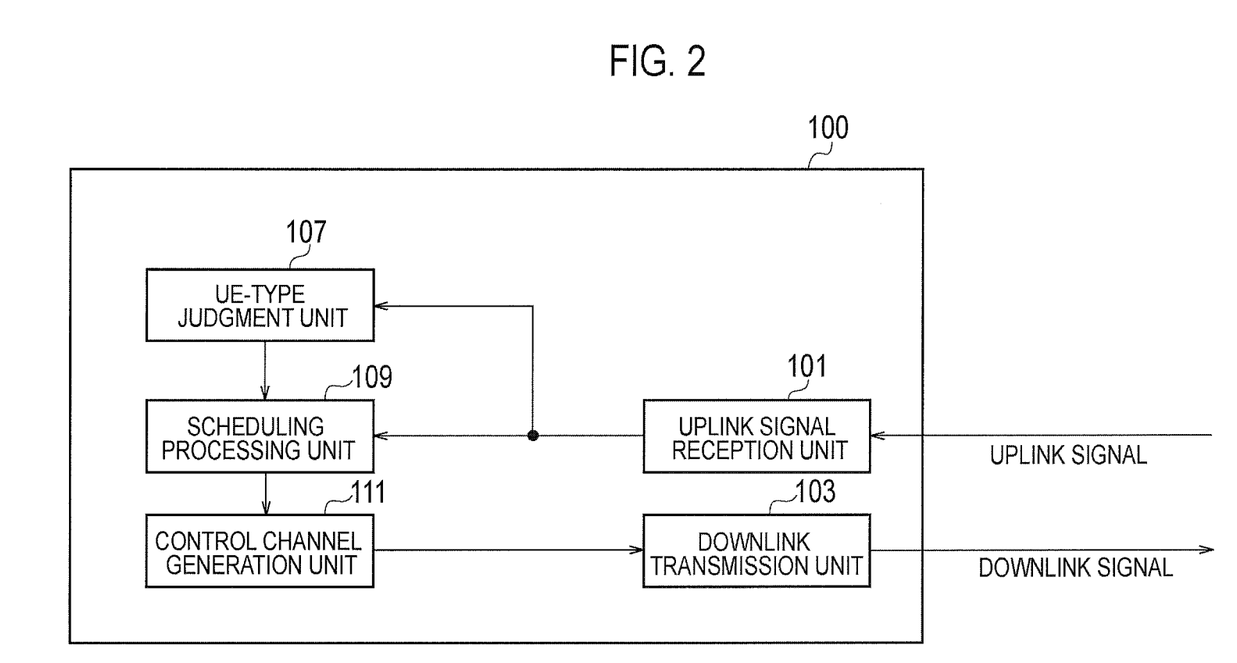
FIG. 2 is a diagram showing a functional block configuration of a base station 100 according to the embodiment of the present invention.

Next, a description is given of a functional block configuration of the radio communication system according to this embodiment. More specifically, a functional block configuration of the base station 100 is described. FIG. 2 is a diagram showing the functional block configuration of the base station 100.

As shown in FIG. 2, the base station 100 includes an uplink signal reception unit 101, a downlink signal transmission unit 103, a UE-type judgment unit 107, a scheduling processing unit 109, and a control channel generation unit 111.

The uplink signal reception unit 101 is configured to receive an uplink radio signal transmitted from the mobile station 200A. The downlink signal transmission unit 103 is configured to transmit a downlink radio signal multiplexed with a PDCCH outputted from the control channel generation unit 111 or the like.

The UE-type judgment unit 107 acquires the type of the mobile station 200A camping on the cell C1. Specifically, the UE-type judgment unit 107 acquires the type of the mobile station based on the control format indicator (CFI) the mobile station 200A supports.

For each of the multiple mobile stations camping on the cell C1, the UE-type judgment unit 107 judges whether the mobile station is a mobile station supporting only allocation formats CFI=1 to 3 (a first predetermined number) (i.e., is a first-type mobile station). Such a mobile station is a mobile station supporting up to Release 10 of LTE.

Further, for each of the multiple mobile stations camping on the cell C1, the UE-type judgment unit 107 judges whether the mobile station supports not only the allocation formats CFI=1 to 3, but also allocation formats CFI=1 to 4 (a second predetermined number) which is more than CFI=1 to 3 (i.e., is a second-type mobile station). Such a mobile station may be a mobile station supporting Release 11.

Figure 5:
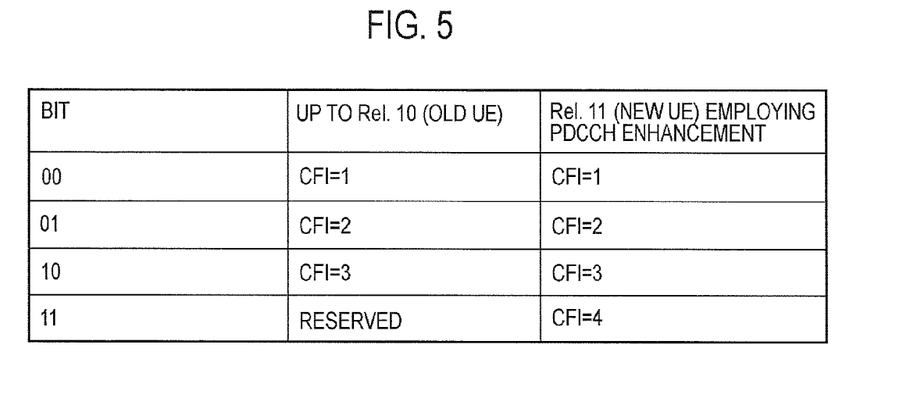
FIG. 5 is a diagram showing a configuration example of a CFI according to the embodiment of the present invention.

FIG. 5 shows a configuration example of the CFI. As shown in FIG. 5, two bits are used for the CFI in this embodiment. For a mobile station supporting up to Release 10 (the first-type mobile station), CFI=1 to 3 (00, 01, and 10) are used, and bit 11 is not used. On the other hand, for a mobile station supporting Release 11 (the second-type mobile station), CFI=1 to 4 (00, 01, 10, and 11) are used, by introduction of PDCCH enhancement.

Note that Release information on the mobile station 200A (UE) can be judged based on information AccessStratum-Release contained in UE capability information notified of by the mobile station 200A in establishing call connection. Specifically, the UE-type judgment unit 107 acquires the type of each of the multiple mobile stations based on AccessStratumRelease contained in the UE capability information notified of by the mobile station, the type being either the first-type mobile station (a mobile station supporting up to Release 10, called an OLD UE below) or the second-type mobile station (a mobile station supporting Release 11, called a NEW UE below).

The scheduling processing unit 109 executes processing for scheduling of radio resources to be allocated to various channels. In particular, in this embodiment, the scheduling processing unit 109 schedules multiple mobile stations to the PDCCH.

Figure 6:
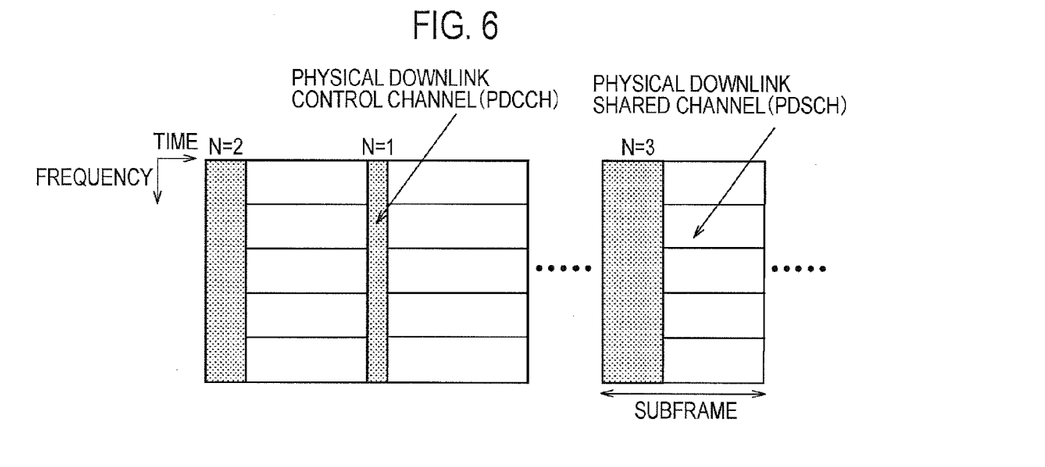
FIG. 6 is a diagram showing an example of allocation of a PDCCH area in a subframe.

FIG. 6 shows an allocation example of an area for the PDCCH in a subframe. As shown in FIG. 6, a subframe is repeatedly transmitted in a predetermined cycle, and to each subframe, an area for the PDCCH (physical downlink control channel) and an area for the PDSCH (physical downlink shared channel) are allocated. The value of N is, as described above, indicated by the CFI, and more OFDM symbols are reserved for the PDCCH from the head of the subframe when the N value is larger.

Note that the base station 100 notifies the mobile station 200A of the value of the CFI on a physical control format indicator channel (PCFICH).

The scheduling processing unit 109 schedules each of the multiple mobile stations targeted for PDCCH scheduling to the PDCCH by use of any one of CFI=1 to 3 when at least one of the mobile stations is an OLD UE.

If it cannot be determined whether a mobile station targeted for PDCCH scheduling is an OLD UE or a NEW UE, the scheduling processing unit 109 may regard this scheduling-target UE as an OLD UE, and use any one of CFI=1 to 3. Moreover, until the UE-type judgment unit 107 judges that a UE targeted for PDCCH scheduling is an OLD UE or a NEW UE, the scheduling processing unit 109 may regard the scheduling-target UE as an OLD UE, and use any one of CFI=1 to 3.

Further, the scheduling processing unit 109 can perform the following processing. Specifically, the scheduling processing unit 109 schedules an OLD UE to the physical downlink control channel by use of any one of CFI=1 to 3 for a particular subframe (called a first subframe herein). Although it is preferable that the scheduling processing unit 109 schedule only an OLD UE for the first subframe, the scheduling processing unit 109 does not necessarily have to schedule only an OLD UE, and a NEW UE may be included as well.

On the other hand, for a second subframe different from the first subframe, the scheduling processing unit 109 schedules a NEW UE to the PDCCH by use of any one of CFI=1 to 4. It is of course preferable that, in the second subframe, the scheduling processing unit 109 schedules only the NEW UE by use of CFI=4 not supported by the OLD UE supporting only CFI=1 to 3.

A conceivable specific method by which the scheduling processing unit 109 allocates OLD UEs and NEW UEs to the subframe is to schedule the OLD UEs and the NEW UEs alternately on a subframe basis. In a typical example, the scheduling processing unit 109 may schedule only OLD UEs for an odd-numbered subframe and schedules only NEW UEs for an even-numbered subframe (or vice versa). Alternatively, according to the number of OLD UEs and NEW UEs camping on the cell C1, the scheduling processing unit 109 may adjust the ratio of subframes to which only the OLD UEs are scheduled and subframes to which only the NEW UEs are scheduled.

The control channel generation unit 111 is configured to generate various control channels based on commands from the scheduling processing unit 109, or more specifically, the control channel generation unit 111 generates a physical downlink control channel (PDCCH).

(3) Operation of the Base Station

Next, a description is given of operation of the radio communication system according to this embodiment. Specifically, a description is given of operation of the base station 100 scheduling the mobile stations to PDCCH resources.

(3.1) Operation Example 1

Figure 3:
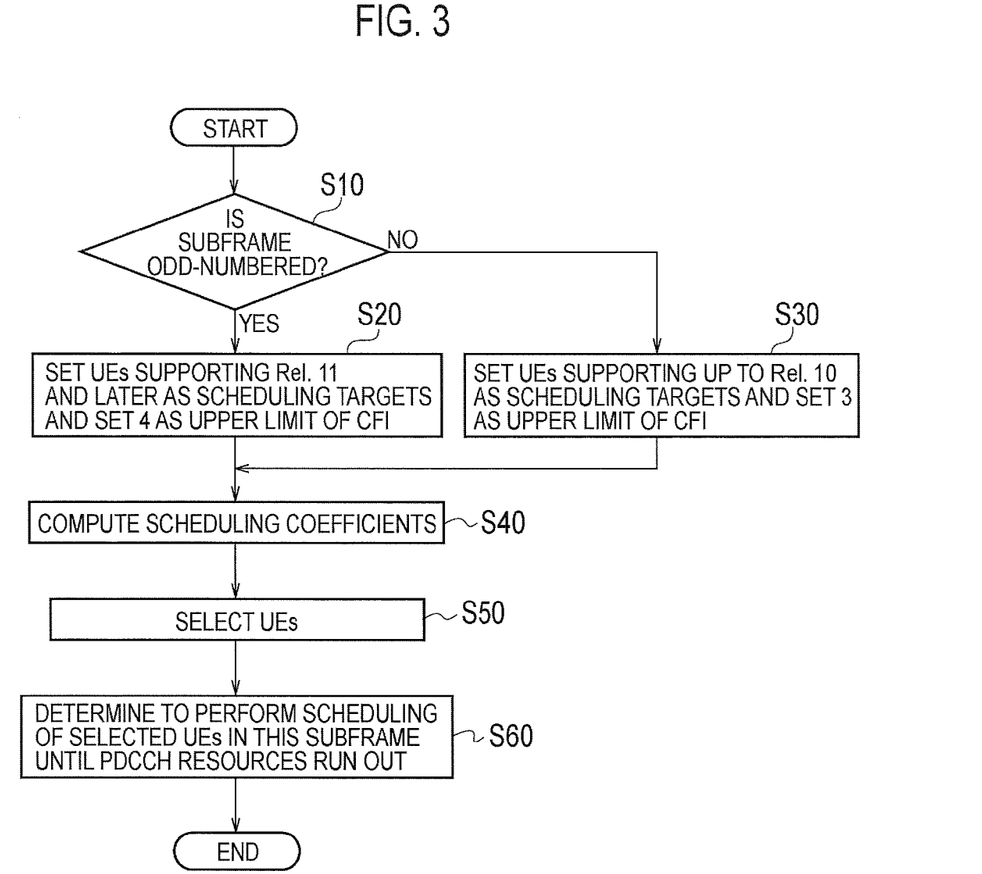
FIG. 3 is a diagram showing an operation flow (part 1) of scheduling mobile stations to PDCCH resources, performed by the base station 100 according to the embodiment of the present invention.

FIG. 3 shows an operation flow (part 1) of the base station 100 scheduling the mobile stations to the PDCCH resources. In this operation example, the scheduled OLD UEs and NEW UEs are completely separated on a subframe basis.

As shown in FIG. 3, the base station 100 judges whether a subframe to be transmitted is odd-numbered or not (S10).

When the subframe is odd-numbered, the base station 100 sets only NEW UEs, i.e., UEs supporting Release 11, as scheduling targets, and sets "4" as an upper limit of the CFI (S20). When, on the other hand, the subframe is even-numbered, the base station 100 sets only OLD UEs, i.e., UEs supporting up to Release 10, as scheduling targets, and sets "3" as an upper limit of the CFI (S30). Note that such separation of subframes for scheduling poses no problem since downlink retransmission timing can be any timing, and uplink retransmission timing is 8 ms later.

The base station 100 computes a scheduling coefficient for each of the scheduling-target UEs (S40), and selects scheduling-target UEs (S50). Next, the base station 100 determines to perform scheduling of the selected target UEs for the subframe until the PDCCH resources defined by the CFI run out (S60).

(3.2) Operation Example 2

Figure 4:
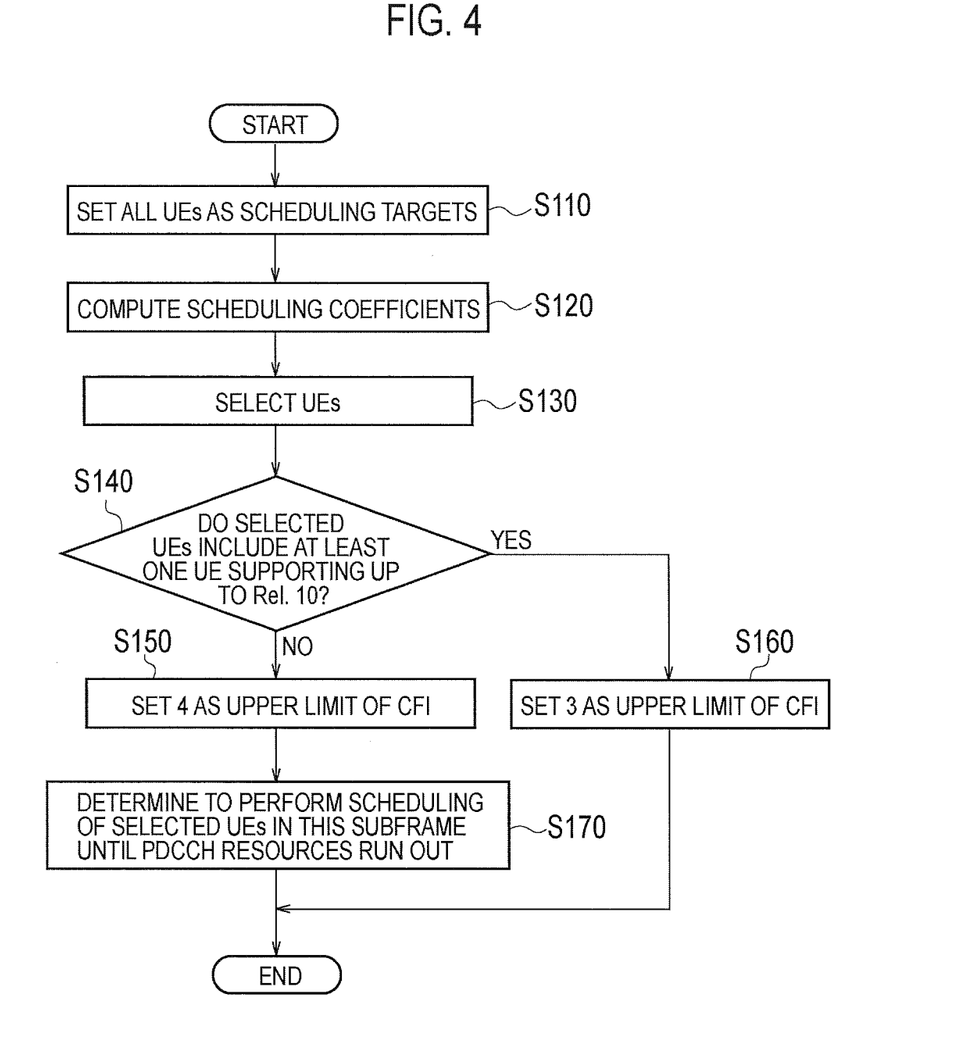
FIG. 4 is a diagram showing an operation flow (part 2) of scheduling mobile stations to PDCCH resources, performed by the base station 100 according to the embodiment of the present invention.

FIG. 4 shows an operation flow (part 2) of the base station 100 scheduling the mobile stations to the PDCCH resources. In this operation example, when scheduling-target mobile stations include at least one OLD UE, the CFI is limited to 1 to 3.

As shown in FIG. 4, the base station 100 sets all the UEs as scheduling targets (S110), as in conventional processing for scheduling of mobile stations.

The base station 100 computes a scheduling coefficient for every one of the scheduling target UEs (S120), and selects scheduling target UEs (S130).

Next, the base station 100 judges whether the selected UEs include at least one OLD UE (a mobile station supporting up to Release 10 of LTE) (S140).

If there is no OLD UE, the base station 100 sets the upper limit of the CFI to "4" (S150). If, on the other hand, there is at least one OLD UE, the base station 100 sets the upper limit of the CFI to "3" (S160).

Next, the base station 100 determines to perform scheduling of the selected target UEs for a subframe until the PDCCH resources defined by the CFI run out (S170).

(4) Advantageous Effects

If mobile stations targeted for scheduling to the PDCCH include an OLD UE (a mobile station supporting up to Release 10), the base station 100 can schedule each of the mobile stations 200A and 200B to the PDCCH by use of any one of CFI=1 to 3. Moreover, the base station 100 can schedule an OLD UE to the PDCCH for a first subframe (e.g., an odd-numbered subframe) by use of any one of CFI=1 to 3, and schedule a NEW UE to the PDCCH for a second frame (e.g., an even-numbered subframe) by use of any one of CFI=1 to 4.

Thus, the base station 100 can allow UEs to correctly receive the PDCCH and the PDSCH (physical downlink shared channel) even if the UEs include both NEW UEs, i.e., UEs supporting PDCCH enhancement and OLD UEs, i.e., UEs not supporting PDCCH enhancement.

In this embodiment, when it cannot be determined whether a scheduling target UE is an OLD UE or a NEW UE, the base station 100 can regard the UE as an OLD UE and use any one of CFI=1 to 3. Further, the base station 100 can also regard the scheduling target UE as an OLD UE and use any one of CFI=1 to 3 until the UE-type judgment unit 107 acquires the type of the UE, indicating whether the UE is an OLD UE or a NEW UE.

Thus, the base station 100 can allow a UE to correctly receive the PDCCH and PDSCH even when the type of the UE cannot be judged in a situation where NEW UEs and OLD UEs coexist.

In this embodiment, the base station 100 can schedule a NEW UE and an OLD UE alternately on a subframe basis. Further, the base station 100 can schedule only an OLD UE for a particular subframe (first subframe).

Thus, even in a situation where NEW UEs and OLD UEs coexist, the base station 100 efficiently allows the UEs of both types to receive the PDCCH and PDSCH.

(5) Other Embodiments

As described above, the details of the present invention have been disclosed by using the embodiment of the present invention. However, it should not be understood that the description and drawings which constitute part of this disclosure limit the present invention. From this disclosure, various alternative embodiments, examples, and operation techniques will be easily found by those skilled in the art.

For example, although the CFI uses two bits to represent a value 1 to 4 in the above embodiment, the number of bits used as the CFI may be three or more, and the value (N) represented by the CFI may be 5 or more.

Further, in the above embodiment, two examples are described: an example (operation example 1) where OLD UEs and NEW UEs to be scheduled are completely separated on a subframe basis, and an example (operation example 2) where, when the scheduling-target mobile stations include at least one OLD UE, the CFI is limited to 1 to 3 or less. These operations may be switched at predetermined intervals or depending on a time zone. Moreover, the above operations may be switched depending on the status of the base station 100. For example, when the load on the base station 100 exceeds a predetermined threshold, the base station 100 may perform only the operation example 2 whose processing load is relatively low.

As described above, the present invention naturally includes various embodiments which are not described herein. Accordingly, the technical scope of the present invention should be determined only by the matters to define the invention in the scope of claims regarded as appropriate based on the description.

Note that the entire content of Japanese Patent Application No. 2011-197613 (filed on Sep. 9, 2011) is incorporated by reference in the present specification.

INDUSTRIAL APPLICABILITY

The characteristics of the present invention can provide a base station and a radio communication method capable of allowing mobile stations to correctly receive a physical downlink control channel (PDCCH) and a physical downlink shared channel even when the mobile stations include both ones supporting PDCCH enhancement and ones not supporting PDCCH enhancement.

EXPLANATION OF THE REFERENCE NUMERALS 50 core network
100 base station
101 uplink signal reception unit
103 downlink signal reception unit
107 UE-type judgment unit
109 scheduling processing unit
111 control channel generation unit
200A, 200B mobile station
C1 cell

The invention claimed is:

1. A base station which communicates with each of a plurality of mobile stations on a physical downlink control channel allocated to a predetermined area in a subframe, by use of any one of allocation formats of the physical downlink control channel, the base station comprising:
a scheduling processing unit configured to schedule the plurality of mobile stations to the physical downlink control channel; and
a mobile-station type judgment unit configured to acquire information on whether each of the plurality of mobile stations is a first-type mobile station supporting only a first predetermined number of the allocation formats or a second-type mobile station supporting a second predetermined number of the allocation formats which include the first predetermined number of the allocation formats, the second predetermined number being larger than the first predetermined number, wherein
the scheduling processing unit schedules each of the plurality of mobile stations to the physical downlink control channel by use of any one of the first predetermined number of the allocation formats when mobile stations targeted to be scheduled to the physical downlink control channel includes the first-type mobile station, wherein
the scheduling processing unit judges whether a subframe to be transmitted is odd-numbered or not, and when the subframe is odd-numbered, sets only the second-type mobile station as scheduling targets and sets an upper limit of the second predetermined number, and when the subframe is even-numbered, sets only the first-type mobile station as scheduling targets and sets an upper limit of the first predetermined number, wherein
when it is impossible to determine whether any of the mobile stations targeted to be scheduled to the physical downlink control channel is the first-type mobile station or the second-type mobile station, the scheduling processing unit regards each of the mobile stations targeted to be scheduled as the first-type mobile station and uses any one of the first predetermined number of the allocation formats.

2. The base station according to claim 1, wherein based on AccessStratumRelease contained in UE capability information notified of by the plurality of mobile stations, the mobile-station type judgment unit judges whether each of the mobile stations is the first-type mobile station or the second-type mobile station.

3. A base station which communicates with each of a plurality of mobile stations on a physical downlink control channel allocated to a predetermined area in a subframe, by use of any one of allocation formats of the physical downlink control channel, the base station comprising:
a scheduling processing unit configured to schedule the plurality of mobile stations to the physical downlink control channel; and
a mobile-station type judgment unit configured to acquire information on whether each of the plurality of mobile stations is a first-type mobile station supporting only a first predetermined number of the allocation formats or a second-type mobile station supporting a second predetermined number of the allocation formats which include the first predetermined number of the allocation formats, the second predetermined number being larger than the first predetermined number, wherein
the scheduling processing unit judges whether a subframe to be transmitted is odd-numbered or not, and when the subframe is odd-numbered, sets only the second-type mobile station as scheduling targets and sets an upper limit of the second predetermined number, and when the subframe is even-numbered, sets only the first-type mobile station as scheduling targets and sets an upper limit of the first predetermined number, wherein
the scheduling processing unit schedules each of the plurality of mobile stations to the physical downlink control channel by use of any one of the first predetermined number of the allocation formats when mobile stations targeted to be scheduled to the physical downlink control channel includes the first-type mobile station, wherein
until the mobile-station type judgment unit judges whether each of the mobile stations targeted to be scheduled to the physical downlink control channel is the first-type mobile station or the second-type mobile station, the scheduling processing unit regards each of the mobile stations targeted to be scheduled as the first-type mobile station and uses any one of the first predetermined number of the allocation formats.

4. A radio communication method for communicating with each of a plurality of mobile stations on a physical downlink control channel allocated to a predetermined area in a subframe, by use of any one of allocation formats of the physical downlink control channel, the method comprising the steps of:
  scheduling the plurality of mobile stations to the physical downlink control channel; and
  judging whether each of the plurality of mobile stations is a first-type mobile station supporting only a first predetermined number of the formats or a second-type mobile station supporting a second predetermined number of the formats, the second predetermined number being larger than the first predetermined number, wherein
  in the scheduling step, each of the plurality of mobile stations is scheduled to the physical downlink control channel by use of any one of the first predetermined number of the allocation formats when mobile stations targeted to be scheduled to the physical downlink control channel include the first-type mobile station
  in the scheduling step, whether a subframe to be transmitted is odd-numbered or not is judged, and when the subframe is odd-numbered, only the second-type mobile station is set as scheduling targets and an upper limit of the second predetermined number is set, and when the subframe is even-numbered, only the first-type mobile station is set as scheduling targets and an upper limit of the first predetermined number is set, wherein
  when it is impossible to determine whether any of the mobile stations targeted to be scheduled to the physical downlink control channel is the first-type mobile station or the second-type mobile station, in the scheduling step, each of the mobile stations targeted to be scheduled is regarded as the first-type mobile station and any one of the first predetermined number of the allocation formats is used.

5. A radio communication method for communicating with each of a plurality of mobile stations on a physical downlink control channel allocated to a predetermined area in a subframe, by use of any one of allocation formats of the physical downlink control channel, the method comprising the steps of:
  scheduling the plurality of mobile stations to the physical downlink control channel; and
  judging whether each of the plurality of mobile stations is a first-type mobile station supporting only a first predetermined number of the formats or a second-type mobile station supporting a second predetermined number of the formats, the second predetermined number being larger than the first predetermined number, wherein
  in the scheduling step, each of the plurality of mobile stations is scheduled to the physical downlink control channel by use of any one of the first predetermined number of the allocation formats when mobile stations targeted to be scheduled to the physical downlink control channel include the first-type mobile station,
  in the scheduling step, whether a subframe to be transmitted is odd-numbered or not is judged, and when the subframe is odd-numbered, only the second-type mobile station is set as scheduling targets and an upper limit of the second predetermined number is set, and when the subframe is even-numbered, only the first-type mobile station is set as scheduling targets and an upper limit of the first predetermined number is set, wherein
  until it is judged whether each of the mobile stations targeted to be scheduled to the physical downlink control channel is the first-type mobile station or the second-type mobile station, each of the mobile stations targeted to be scheduled is regarded as the first-type mobile station and any one of the first predetermined number of the allocation formats is used.

* * * * *